United States Patent [19]

Busson

[11] 4,342,111
[45] Jul. 27, 1982

[54] DIGITAL BRIDGING APPARATUS FOR TELEPHONE CONFERENCING SYSTEM

[75] Inventor: Donald G. Busson, New Windsor, Md.

[73] Assignee: The United States of America as represented by the Director, National Security Agency, U.S. Government, Washington, D.C.

[21] Appl. No.: 208,107

[22] Filed: Nov. 18, 1980

[51] Int. Cl.³ .............................................. H04M 3/56
[52] U.S. Cl. ................................................... 370/62
[58] Field of Search .......... 370/62; 179/18 BC, 1 CN

[56] References Cited

U.S. PATENT DOCUMENTS

| | | | |
|---|---|---|---|
| 3,508,007 | 4/1970 | Goodall et al. | 370/62 |
| 3,748,394 | 7/1973 | Thomas | 179/18 BC |
| 3,761,619 | 9/1973 | Pommerening | 370/62 X |
| 3,787,820 | 1/1974 | Sherman | 370/58 X |
| 3,903,372 | 9/1975 | Aro | 179/18 BC |
| 3,924,082 | 12/1975 | Oliver et al. | 179/18 BC |
| 3,937,898 | 2/1976 | Presto et al. | 179/18 BC |
| 3,984,643 | 10/1976 | Inrig et al. | 179/18 BC |
| 4,268,722 | 5/1981 | Little et al. | 179/2 EB |

Primary Examiner—Thomas W. Brown
Attorney, Agent, or Firm—John R. Utermohle; Thomas O. Maser

[57] ABSTRACT

A digital bridge for a telephone conferencing circuit which provides multiple conferencing capability. Microprocessor signals to a buffered memory control switching of parallel communications data into a time division multiplexed serial stream for transmission, with the position of data within each frame of the stream being a function of the intended destination. High speed switching capability results from the buffered memory circuit which is simultaneously filled with new data as current data is utilized.

3 Claims, 7 Drawing Figures

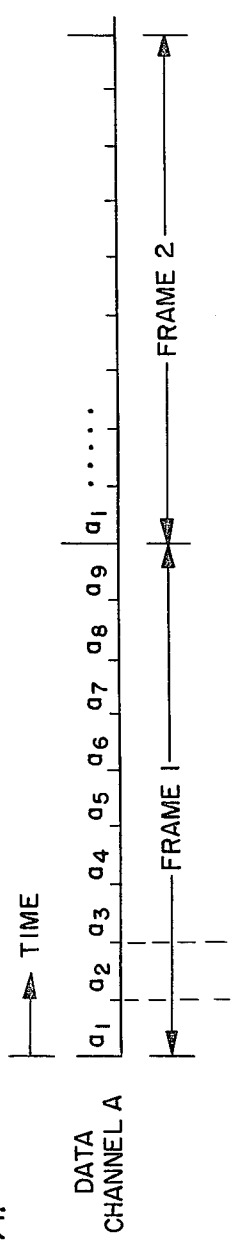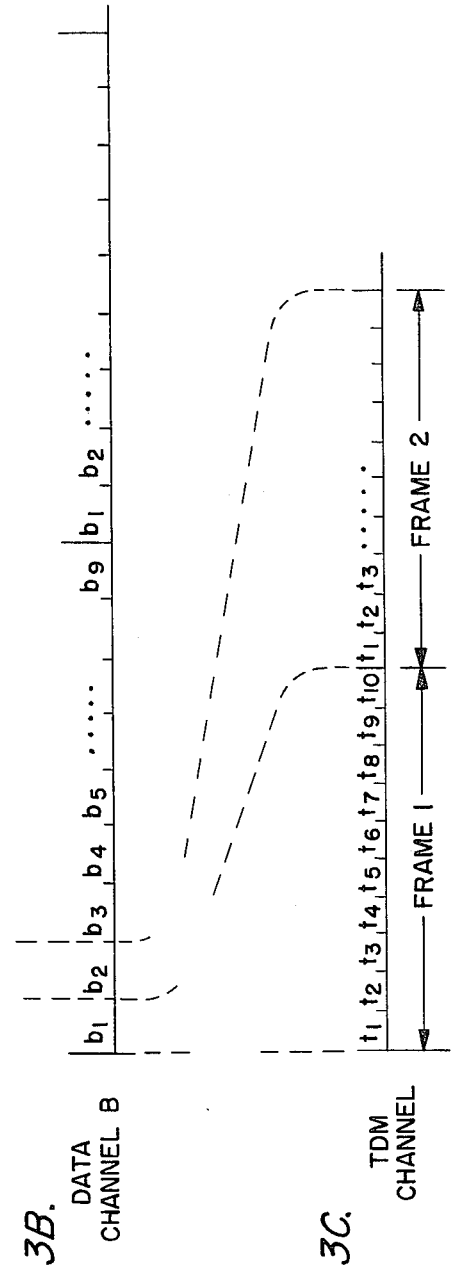
FIG. 3A.
FIG. 3B.
FIG. 3C.
FIG. 3D.

DIGITAL BRIDGING APPARATUS FOR TELEPHONE CONFERENCING SYSTEM

BACKGROUND OF THE INVENTION

1. Field of the Invention

This invention relates to the field of digital communications, and more specifically to a digital bridging apparatus having particular utility in telephone conferencing systems.

2. Description of the Prior Art

Telephone conferencing, the connecting of three or more telephones simultaneously into a single circuit, has existed for many years. Most such systems utilize analog signals, and the output of the switching circuit is merely the algebraic sum of the inputs. This technique is not possible with digital voice communications networks because there is no known technique for summing the individual binary signals and subsequently decoding the sum back into an intelligible analog voice signal.

For many reasons, including a need for increased data transmission rate capability and for maintaining overall transmission quality, it is highly desirable to provide conferencing capability to digital telephone networks. Such capability has been provided in the past either by networks which allow for only one conference call to occur at a time or by networks which require a separate digital bridge for each allowable conference call. The disadvantages of the prior art are obvious: the first has severely limited capability and the second is highly complex and expensive.

SUMMARY OF THE INVENTION

It is an object of this invention to provide a digital bridge for a telephone conferencing circuit which overcomes the many disadvantages of the prior art.

It is a further object to provide multiple conferencing capability with only a single digital bridge circuit.

A still further object is to provide for high speed data transfer in a time division multiplexed network.

Another object is to provide multi-data rate transmissions in a single telephone conferencing network.

A digital bridging apparatus having these and other advantages may include a plurality of inputs, a plurality of outputs, means for multiplexing signals received on said inputs into a serial data stream, means for receiving and demultiplexing said data stream and for routing the input signals to the outputs according to the order in which said signals were received, and means controlling said multiplexing means for selectively arranging said signals into said serial data stream sequentially according to the intended output.

BRIEF DESCRIPTION OF THE DRAWINGS

Other objects and many of the attendant advantages of my invention will be readily apparent as the invention becomes better understood by reading the description below, when read together with the drawings, in which:

FIGS. 3A-3D are timing diagrams describing certain aspects of my invention, and

DESCRIPTION OF THE PREFERRED EMBODIMENT

Figure 1:
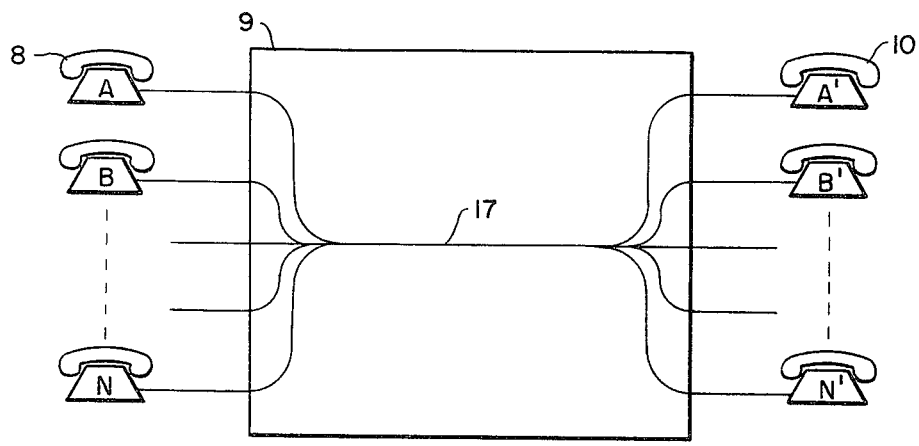
FIG. 1 illustrates a telephone network.

FIG. 1 is a block diagram representation of a telephone switching network into which my invention might be incorporated. A plurality of telephones A-N each having a microphone 8 are connected by a digital bridge 9 to a plurality of telephones A'-N' each having a receiver 10. Within the digital bridge, signals received in parallel from the microphone 8 of any one or more of the telephones A-N are multiplexed into a serial data stream 17 for transmission. It should be understood that telephone A and telephone A' are in fact the same unit, with A representing the telephone when providing input and A' representing the telephone when receiving output. For purposes of understanding my invention, and for reasons which will later become apparent, it is convenient to think of the telephones A, B, . . . N as representing the telephones used by the speakers at any given instant and with telephones A', B', . . . N' representing the telephones used by the listeners.

Briefly, the network provides telephone conferencing capability between any combination of telephone sets, and allows a plurality of conferences to take place simultaneously. Stated alternatively, the function of the digital bridge is to route a digital data stream from any number of calling stations to any arbitrary but exclusive subset of receiver stations as specified by a control unit.

Figure 2:
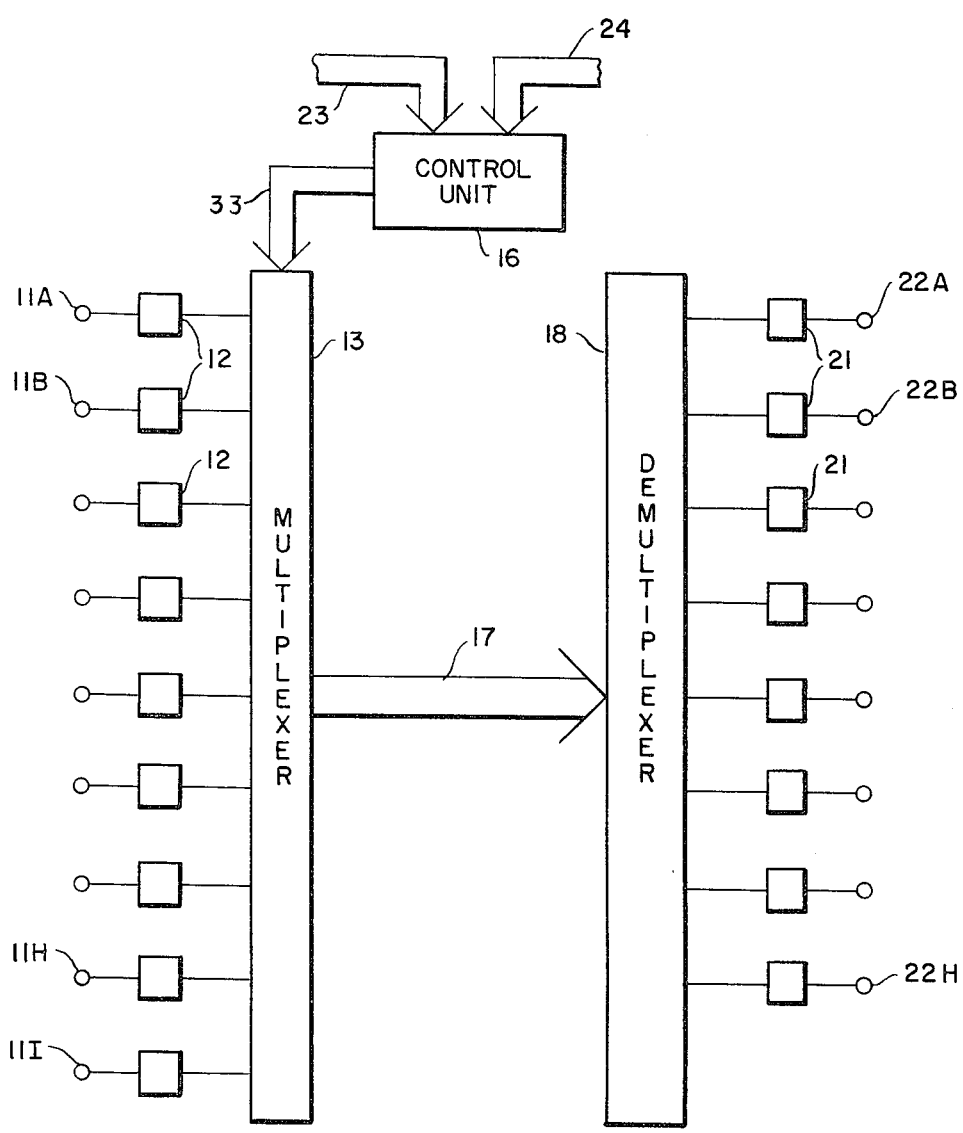
FIG. 2 illustrates a digital bridge encompassing my invention.

FIG. 2 is a block diagram of a digital bridge utilizing the concepts of my invention. A plurality of input terminals 11A-11H connect the telephone microphone 8 of telephones A-N of FIG. 1 through a plurality of latches, or 1-bit delay stages, 12—12 to a parallel-to-serial converter or multiplexer 13 under the control of a control unit 16. A serial data stream 17, comprising all of the information received from the individual channels, exits from multiplexer 13 and enters a serial-to-parallel converter, or demultiplexer, 18 which routes the individual channel data through a plurality of latches 21—21 to the appropriate combination of telephone receivers connected to output terminals 22A-22H.

Control unit 16 receives data from calling telephones A-H via inputs 23 and 24 and provides necessary switching information to multiplexer 13 over control lines 33. More specifically, control unit 16 initially receives, through input 23, data to identify the specific telephones to be connected in a calling circuit, whether as a conference call or a single party connection. Following the initial connection, and throughout the duration of the call, information is continuously provided on input 24 to identify the set held by the current speaker. In effect, the speaker is "chosen" by the control unit after examining voice activity information provided on input 24. Latches 12—12 are provided for the purpose of establishing synchronization of the various incoming data signals prior to their entering multiplexer 13. This is necessary to hold the data while it is being sampled by the multiplexing network.

Multiplexer 13 receives the incoming data from the latches 12—12 and, under the direction of control unit 16, creates a time division multiplexed serial data stream 17. The precise manner in which the serial stream is generated is explained more fully below; at this point it is important to recognize that data bits within each time division multiplexed (TDM) frame are ordered according to the intended destination rather than their source.

FIGS. 3A-3B represent data streams typical of those found in a digital telephone network. A first telephone "A" will produce an analog signal which is digitized by any conventional means to produce, at terminal 11A, a digital data stream as represented in FIG. 3A. The symbol "$a_1$" represents a bit of binary data to be transmitted in the first time block of the frame, "$a_2$" the bit in the second block, etc. Each additional telephone in use will simultaneously produce a similar data stream, with FIG. 3B illustrating the stream for telephone "B" at terminal 11B. FIG. 3C is a representation of the TDM data stream 17. A frame of TDM data consists of a binary word having a bit length at least equal to the total number of telephones in the network. If, for example, there were 256 telephones connected to the digital bridge, a frame size of at least 256 bits would be required. For purposes of illustration it will be assumed that eight telephones A-H are available, with a TDM frame length of ten bits. Let it further be assumed that four telephones (B, C, F and H) are to be connected in a conference circuit, with a simultaneous conference connection between telephones D, E and G. Telephone A is idle. Finally, let it be assumed that in the first connection the present speaker holds telephone F and that in the second connection the present speaker holds telephone D.

For the above situation to exist it is necessary that a call initiator, one of the parties in each conference, shall have informed control unit 16 via input 23 which telephones were to be placed on its conference connection. Any of the many means for initiating a conference connection known in the prior art would be available for this purpose. Control unit 16 continuously receives additional data through input 24 to monitor activity on all circuits to determine which is held by the present speaker.

Parallel-to-serial converter 13 is a conventional multiplexer unit with the capability to switch the signal on any selected input 11 to the TDM data stream 17 under the control of control unit 16. Information is switched into the appropriate bit location of each frame of TDM data in a manner which insures receipt of the proper information bit by the intended receiver. This is achieved by assigning a specific bit location in each frame of TDM data to each telephone receiver, e.g., frame bit 1 will always go to telephone A', frame bit 2 will always go to telephone B', etc. Serial-to parallel converter 18 performs the above function. It may be a simple 8-bit shift register which provides a parallel dump to the latches 21—21 each time the register is filled with a new TDM frame of data.

In the example set out above, no data will be transmitted in TDM frame bit location 1 because telephone A has been defined to be idle. For this purpose it is necessary that one additional data channel having input 11I exist which is not connected to any telephone and which is dedicated to transmission of silence. Frame bit locations 2, 3 and 8 will contain the data transmitted by the speaker on telephone F and frame bit locations 5 and 7 will contain the data bit transmitted by the speaker on telephone D. The time slots alloted to the current speakers' telephones, F and D, may be filled with silence or that of another speaker on the circuit attempting to interrupt. FIG. 3D illustrates the contents of three TDM data frames for the example set forth above.

It is apparent from a study of the time diagrams 3A-3D that eight TDM frames are required for transmission of a single data channel frame of information. It follows that the length of one TDM channel bit time must be no greater than 1/x times the length of one data channel bit time, where x is the total number of telephones in the circuit. It is also clear from the above that any number or combination of simultaneous two-party or conference calls is made possible by proper switching of data by control unit 16 into the correct TDM frame bit location.

Figure 4:
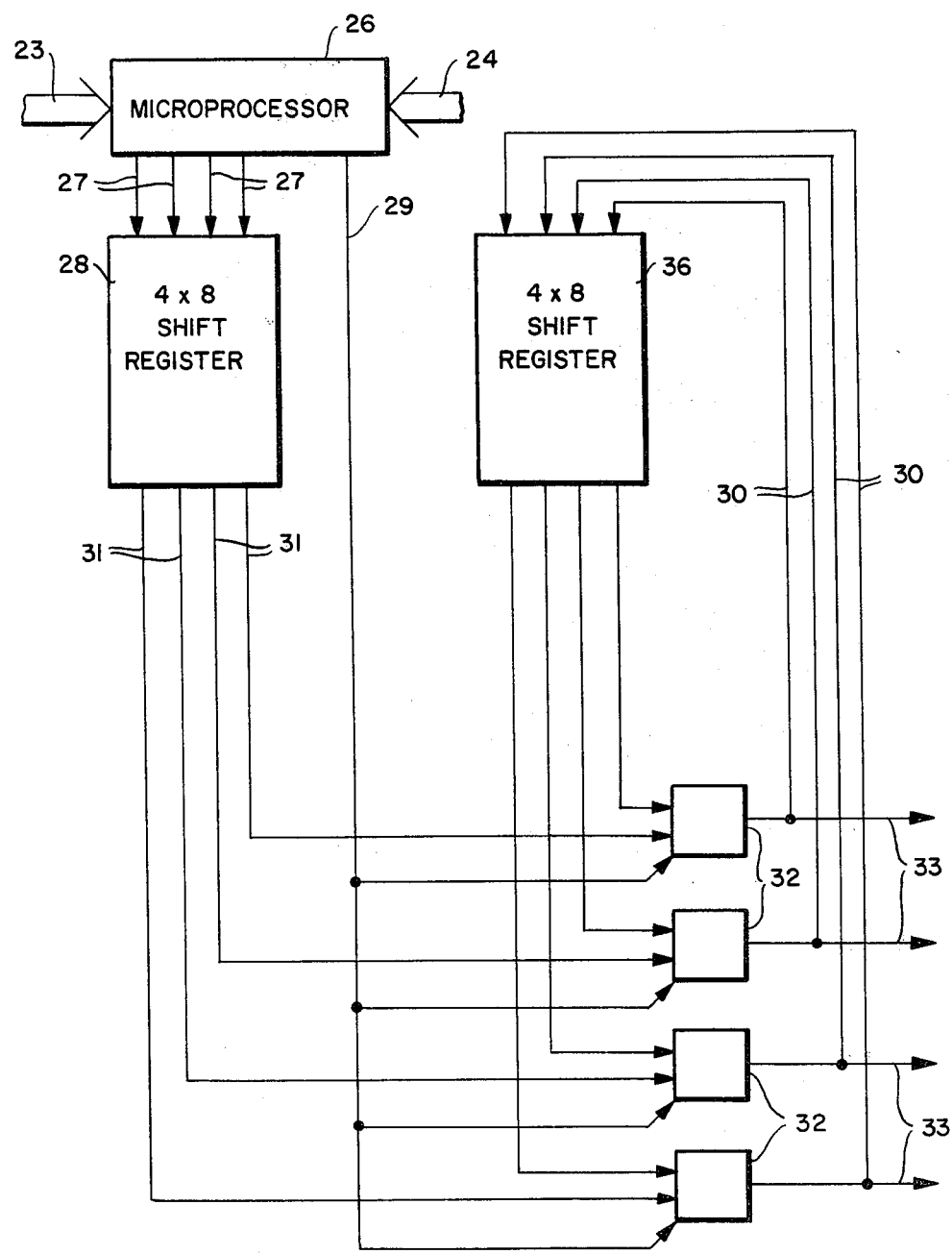
FIG. 4 illustrates the control portion of my invention.

FIG. 4 illustrates the control unit 16 of my invention. The purpose of the control unit is to address each input 11 in the correct sequence to correctly order the data into the TDM stream 17. A microprocessor 26 receives inputs 23 and 24 from the telephones used by the speakers and provides output data on lines 27—27 to a 4-bit by 8-bit shift register 28. Output lines 31 from shift register 28 are connected to switches 32—32, which in turn are connected by lines 33 to multiplexer 13 and by lines 30 to a second 4-bit by 8-bit shift register 36.

Microprocessor 26 provides the dual function of keeping track of activity on the various telephone circuits and of routing information from each speakers' telephone into the appropriate bit positions of the TDM data stream. Initially, information is provided to the microprocessor from the calling party to establish the conference connection. Thereafter, an activity detector monitors each circuit to determine which one is being used by the current speaker and to route information on that circuit to the remaining telephones in the circuit.

Each telephone transmitter (speaker) is assigned a unique binary address for purposes of information routing. Assuming the example previously set forth, let the telephone microphones have addresses as assigned below:

| Telephone | Address |
|---|---|
| A | 0000 |
| B | 0001 |
| C | 0010 |
| D | 0011 |
| E | 0100 |
| F | 0101 |
| G | 0110 |
| H | 0111 |
| I (Silence) | 1000 |

If telephone F is transmitting information to telephones B', C' and H', at frame time $t_1$ the microprocessor outputs the address 1000 into shift register 28 to indicate that silence is to be transmitted to the idle telephone A. At frame time $t_2$, the address 0101 is sent from microprocessor 26 into shift register 28 to indicate that information from telephone transmitter F is to be routed to receiver B'. The address 1000 previously stored in shift register 28 is shifted down one position and saved. At frame time $t_3$ the previously stored addresses 1000 and 0101 are shifted down, and the address 0101 is provided from microprocessor 26 into shift register 28 to indicate that information from transmitter F is also to be transmitted to receiver C'. Similarly microprocessor 26 sequentially relays additional addresses $t_4 \rightarrow 1000$
$t_5 \rightarrow 0011$
$t_6 \rightarrow 1000$
$t_7 \rightarrow 0011$
$t_8 \rightarrow 0101$ into shift register 28. Thus, during the time period necessary to transmit one frame of serial data, shift register 28 has been filled with a group of addresses indicative of the proper routing of all data to be transmitted in one TDM frame period. It should be apparent from the above that the size of the register is dependent on the number of telephones in the network, with the row length dictated by the number of bits necessary to give each telephone a unique address and the column length determined by the number of telephones.

Referring again to FIGS. 3A–B and FIG. 3D, it is apparent that eight TDM frames are required to transmit one data frame. It follows that the same addresses first generated and provided to register 28 will be utilized eight consecutive times, because each address is used to transmit only one data bit at a time, and all addresses are used in each TDM frame. Two problems are thereby created, both of which are solved by inclusion of the second shift register 36. The first problem relates to the fact that shift register 28 cannot receive new addresses until the prior addresses have been used. A second problem is that the microprocessor is speed limited and at high data rates cannot generate new addresses as fast as they can be utilized by the data transmission circuits.

Prior to transmission of the first TDM frame, shift register 28 must have been filled in accordance with the procedure previously described. A signal from microprocessor 26 via line 29 to switches 32—32 causes routing of the first address in register 28 via lines 31 through switches 32—32 to multiplexer 13 over lines 33—33. In a conventional manner, the data bits in latches 12—12 are routed into the TDM channel. The first address is simultaneously routed via lines 30 into register 36. The remaining seven addresses in register 28 are sequentially switched through switches 32—32 into both multiplexer 13 and register 36. Following transmission of the first TDM frame, register 28 is empty and register 36 contains the eight addresses formerly stored in register 28. The microprocessor or separate timing logic (not shown) then sends a signal on line 29 to switches 32—32, causing them to receive their inputs from register 36 instead of register 28. The next seven TDM frames are then transmitted, with addresses sequentially routed through switches 32—32 to multiplexer 13 and recirculated back into register 36.

The time required to transmit the last seven TDM frames is utilized by microprocessor 26 to receive new data on lines 23 relative to a change of speakers or termination or initiation of calls, to compute new addresses as required, and to fill register 28 with the addresses for the next TDM data frames. The rapid and efficient transfer of great quantities of digital data is thus made possible.

While the above embodiment has been described in terms of a small telephone network utilizing short TDM and data frame lengths for purposes of simplifying the description, it is to be understood that the greatest advantages of my circuit result from its use in significantly more complex systems. A practical implementation might include a 64 channel, 9.6 KHz circuit in which telephone data frames of 240-bit lengths are multiplexed into a 64 bit TDM stream operating at 960 KHz. The address portion of the parallel-to serial converter would thus receive 64 different addresses at the rate of one address each 1.04 µsec during each 104 µsec data period. Each TDM frame would thus have an inactive period of about 37 µsec to allow for proper switching of address data between the two shift registers. It would be a simple adaptation to provide additional input channels operating at slower data rates, e.g. 2.4 KHz or 4.8 KHz, for simultaneous transmission of non-voice type data.

Finally, it should be understood that the above description is of a preferred embodiment, which may be easily adopted to any number of data processing applications utilizing my invention, the scope of which I intend to be limited only as set forth in the claims which follow.

I claim:

1. In a digital conferencing apparatus wherein a multiplexer receives a plurality of input signals and provides a single serial data stream, and a demultiplexer receives said serial stream and subsequently provides a plurality of output signals, controlling means, comprising:

a microprocessor;
a first shift register which sequentially receives from said microprocessor signals indicative of the input signal to be routed into said serial data stream;
a second shift register, and
switching means connecting the outputs of said first and second shift registers to said multiplexer and also connecting said first shift register to said second shift register.

2. The apparatus of claim 1 wherein said switching means comprises a plurality of switches, each switch having a first input from said first shift register and a second input from said second register.

3. The apparatus of claim 2 wherein each of said switches includes an input connected to said microprocessor for controlling the passage of input signals through said switches.

* * * * *